United States Patent
Lee et al.

(10) Patent No.: US 9,841,060 B2
(45) Date of Patent: Dec. 12, 2017

(54) TORSIONAL VIBRATION DAMPER FOR HYDROKINETIC TORQUE COUPLING DEVICE WITH INNER AND OUTER ELASTIC DAMPING MEMBERS CONNECTED IN SERIES

(71) Applicant: VALEO EMBRAYAGES, Amiens (FR)

(72) Inventors: Sungchul Lee, Troy, MI (US); Rabah Arhab, Saint-Brice-Sous-Foret (FR); Josip Kovac, Northville, MI (US)

(73) Assignee: Valeo Embrayages (FR)

( * ) Notice: Subject to any disclaimer, the term of this patent is extended or adjusted under 35 U.S.C. 154(b) by 76 days.

(21) Appl. No.: 14/887,583

(22) Filed: Oct. 20, 2015

(65) Prior Publication Data

US 2017/0108050 A1   Apr. 20, 2017

(51) Int. Cl.
  *F16D 3/12*   (2006.01)
  *F16F 15/123*   (2006.01)
  *F16H 45/02*   (2006.01)

(52) U.S. Cl.
  CPC ............ *F16D 3/12* (2013.01); *F16F 15/1234* (2013.01); *F16H 45/02* (2013.01); *F16D 2250/0084* (2013.01); *F16H 2045/0205* (2013.01); *F16H 2045/0221* (2013.01); *F16H 2045/0226* (2013.01); *F16H 2045/0278* (2013.01)

(58) Field of Classification Search
  CPC ............ F16H 45/02; F16H 2045/0221; F16H 2045/0226; F16H 2045/0231
  See application file for complete search history.

(56) References Cited

U.S. PATENT DOCUMENTS

| | | | |
|---|---|---|---|
| 8,602,901 B2 | 12/2013 | Verhoog | |
| 8,771,088 B2* | 7/2014 | Takikawa | F16H 45/02 464/68.8 |
| 9,568,049 B2 | 2/2017 | Verhoog et al. | |
| 2012/0247901 A1* | 10/2012 | Kawahara | F16H 45/02 192/3.28 |
| 2012/0252587 A1 | 10/2012 | Takikawa et al. | |

FOREIGN PATENT DOCUMENTS

| | | |
|---|---|---|
| JP | 2006029553 A | 2/2006 |
| JP | 2008208855 A | 9/2008 |
| WO | WO2013140082 A1 | 9/2013 |

* cited by examiner

*Primary Examiner* — Jacob S Scott
(74) *Attorney, Agent, or Firm* — Berenato & White, LLC

(57) ABSTRACT

A hydrokinetic torque coupling device comprises a casing rotatable about a rotation axis, a torque converter including an impeller wheel and a turbine wheel disposed in the casing coaxially with the rotation axis, a turbine hub disposed in the casing coaxially with the rotation axis and fixed to the turbine wheel, and a torsional vibration damper. The torsional vibration damper comprises a driven member fixed to the turbine hub, a drive member rotatable relative to the driven member about the rotation axis, and a plurality of circumferentially acting outer and inner elastic damping members. The drive member and the driven member are operatively connected to both the radially outer and inner elastic damping members. The radially outer and inner elastic damping members are arranged in series.

20 Claims, 9 Drawing Sheets

TORSIONAL VIBRATION DAMPER FOR HYDROKINETIC TORQUE COUPLING DEVICE WITH INNER AND OUTER ELASTIC DAMPING MEMBERS CONNECTED IN SERIES

FIELD OF THE INVENTION

The invention generally relates to torsional vibration dampers and, more particularly, to a torsional vibration damper for a hydrokinetic torque coupling device including radially inner and outer elastic damping members connected in series.

BACKGROUND OF THE INVENTION

In the evolution of automobiles from motorized carriages to highly regulated devices for mass transportation, there has been a continuous pursuit of refinement of the basic combination of elements that comprise the automobile. One aspect of this refinement has been the transmission of torque from the engine to the drive system of the vehicle. This transmission of torque has, throughout, been accomplished by various gear or chain driven transmission systems alternatively drivingly connected to, or disconnected from, a source of motive power. The connection/disconnection feature of the drive system is accomplished by means of a clutch. Since the mid-1950's, especially in the United States, this clutch has been a hydrokinetic torque coupling device or torque converter. Owing to the inclusion of this fluid torque transmitting coupling, enhanced refinement of the driving experience has been obtained, but this refinement came at the expense of lost efficiency. To address this lost efficiency, the torque converter has become, itself, an object of greater refinement and recaptured efficiency. Oftentimes, a modern era torque converter will include a friction clutch assembly associated with a driven member of the torque converter which, at preset loads and speeds, eliminates the fluid transmission of torque and replaces the fluid coupling with a direct mechanical friction coupling. This feature is commonly referred to as a lock-up clutch.

In the era of the lock-up clutch equipped torque converter, efficiency has been recaptured, but a loss of refinement has also occurred when the clutch is in lock-up mode and when it is transitioning into and out of lock-up mode. This is especially true when the lock-up clutch elements become worn and tolerances between various rotating and fixed elements increase/decrease in accord with their respective wear patterns. To alleviate some of the mechanical coarseness created by the incorporation of lock-up clutches onto torque converters, the clutch systems, themselves, have increased in complexity. This added complexity creates the potential for a loss of refinement through vibration caused, in part, by unbalanced decentered rotation of the various components.

Accordingly, the coupling device comprises a torsional vibration damper which is designed to damp the noises and vibrations derived from the engine. This torsional vibration damper comprises first and second damping means which are arranged in parallel by means of a connection disc which is designed to be rendered integral in rotation with one of the drive or driven shafts.

The first damping means comprises resilient units which are distributed circumferentially around the axis of the drive and driven shafts. Each resilient unit extends circumferentially between first support seats which are supported by the connection disc.

The second damping means comprise groups of resilient units, each comprising at least two first resilient units which are arranged in series by means of a first intermediate support element, each group extending circumferentially between second support seats which are supported by the connection disc.

It will be noted that the rigidity of a damper of this type is generally too great to damp vibrations efficiently in the case of transmission of a high level of torque between the engine and the means for changing the gear ratio of the motor vehicle, and in particular torque greater than 400 Nm.

While torsional vibration dampers for the hydrokinetic torque coupling devices, including but not limited to that discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque coupling device for coupling together a driving shaft and a driven shaft. The kinetic torque coupling device comprises a casing rotatable about a rotation axis, a torque converter including an impeller wheel and a turbine wheel disposed in the casing coaxially with the rotation axis, a turbine hub disposed in the casing coaxially with the rotation axis and non-rotatably secured to the turbine wheel, and a torsional vibration damper. The torsional vibration damper comprises a drive member rotatable about the rotation axis, a driven member rotatable relative to the drive about the rotation axis and non-rotatably secured to the turbine hub, a plurality of radially outer elastic damping members interposed and circumferentially acting between the drive member and the driven member, and a plurality of radially inner elastic damping members interposed and circumferentially acting between the drive member and the driven member. The drive member and the driven member are operatively connected to both the radially outer and inner elastic damping members. The radially outer and inner elastic damping members are arranged in series.

According to a second aspect of the present invention, there is provided a torsional vibration damper for a hydrokinetic torque coupling device. The torsional vibration damper comprises an input member rotatable about the rotation axis, an output member rotatable relative to the input member about the rotation axis, a plurality of radially outer elastic damping members interposed and circumferentially acting between the input member and the output member, and a plurality of radially inner elastic damping members interposed and circumferentially acting between the input member and the output member. The input member and the output member are operatively connected to both the radially outer and inner elastic damping members. The radially outer and inner elastic damping members are arranged in series.

According to a third aspect of the present invention, there is provided a method for assembling a torsional vibration damper for a hydrokinetic torque coupling device. The method of the present invention comprises the steps of providing a driven member, radially outer and inner elastic damping members and a drive member, and mounting the driven member to the drive member through the radially outer and inner elastic damping members so that the radially outer and inner elastic damping members being arranged in series. The radially outer elastic damping members are disposed radially over the radially inner elastic damping members.

Other aspects of the invention, including apparatus, devices, systems, converters, processes, methods, and the like which constitute part of the invention, will become more apparent upon reading the following detailed description of the exemplary embodiments.

BRIEF DESCRIPTION OF THE SEVERAL
VIEWS OF THE DRAWING(S)

The accompanying drawings are incorporated in and constitute a part of the application. The drawings, together with the general description given above and the detailed description of the exemplary embodiments and methods given below, serve to explain the principles of the invention. In such drawings.

Figure 1:
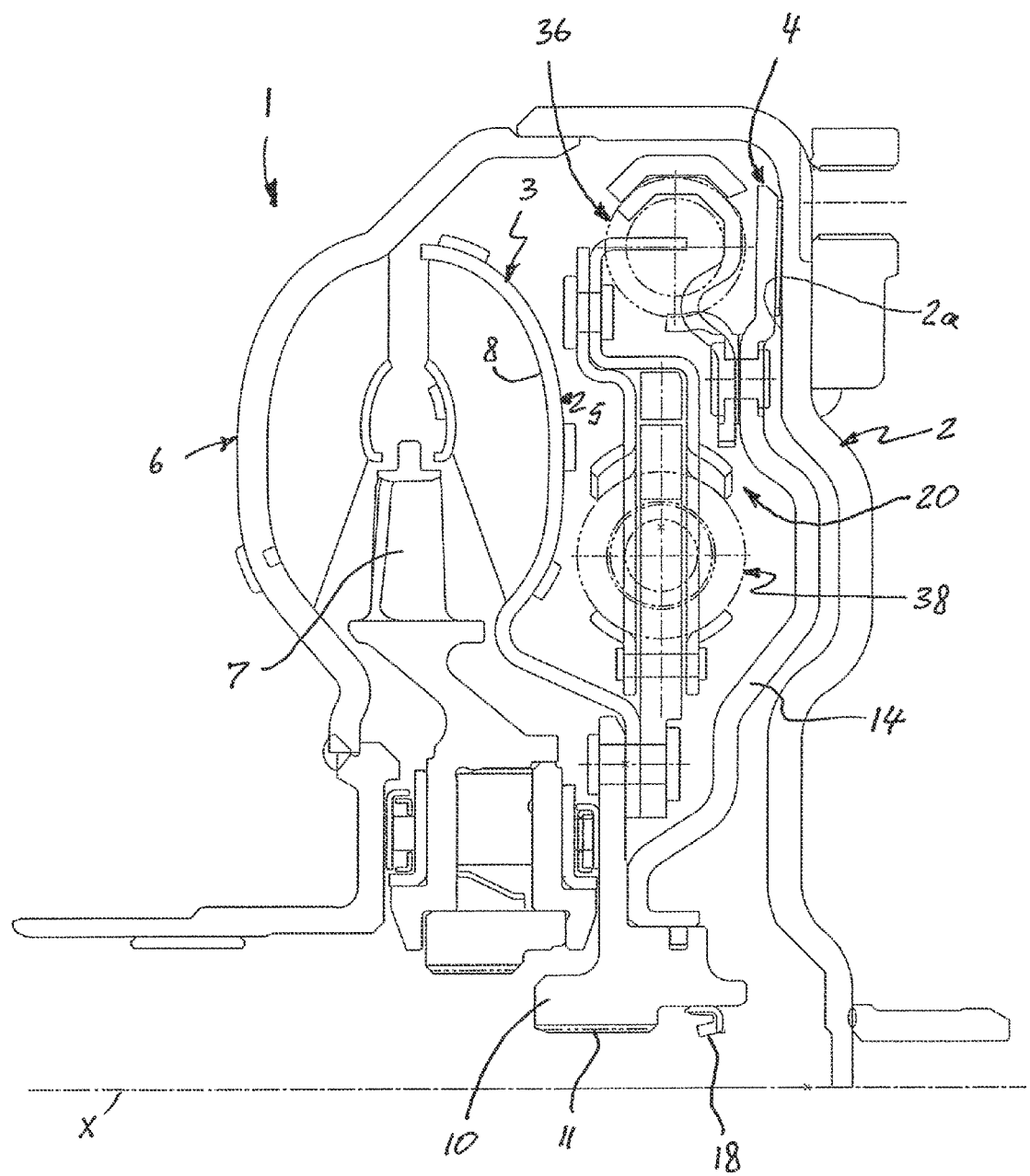
FIG. 1 is a half-view in axial section of a hydrokinetic torque coupling device with a torsional vibration damper in accordance with an exemplary embodiment of the present invention.

DETAILED DESCRIPTION OF EXEMPLARY
EMBODIMENT(S) AND EMBODIED
METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

An exemplary embodiment of a hydrokinetic torque coupling device is generally represented in the accompanying drawings by reference numeral 1, as best shown in a fragmentary sectional view in FIG. 1. The hydrokinetic torque coupling device 1, such as a hydrokinetic torque converter, is intended to couple driving and driven shafts, for example in a motor vehicle. In this case, the driving shaft is an output shaft of an internal combustion engine (not shown) of the motor vehicle and the driven shaft is connected to an automatic transmission of the motor vehicle.

The hydrokinetic torque coupling device 1 comprises a sealed casing 2 filled with oil and rotatable about a rotation axis X. The hydrokinetic torque coupling device 1 further comprises a hydrodynamic torque converter 3, a lock-up clutch 4 and a torsional vibration damper (also referred to herein as a damper assembly) 20, all disposed in the sealed casing 2. Hereinafter the axial and radial orientations are considered with respect to the rotation axis X of the torque coupling device 1. The torque converter 3, the lock-up clutch 4 and the torsional vibration damper 20 are all rotatable about the rotation axis X. The torque converter 3 comprises a turbine wheel 5, an impeller wheel 6, and a reactor (or stator) 7 interposed axially between the turbine wheel 5 and the impeller wheel 6. The turbine wheel 5 includes a substantially semi-toroidal turbine shell 8, best shown in FIG. 1.

The torque coupling device 1 also includes a turbine (or output) hub 10 rotatable about the rotation axis X, which is arranged to non-rotatably couple together the driven shaft and the turbine wheel 5. In the following description, axial and radial orientations will be considered with respect to the rotation axis X of the turbine hub 10.

Figure 2:
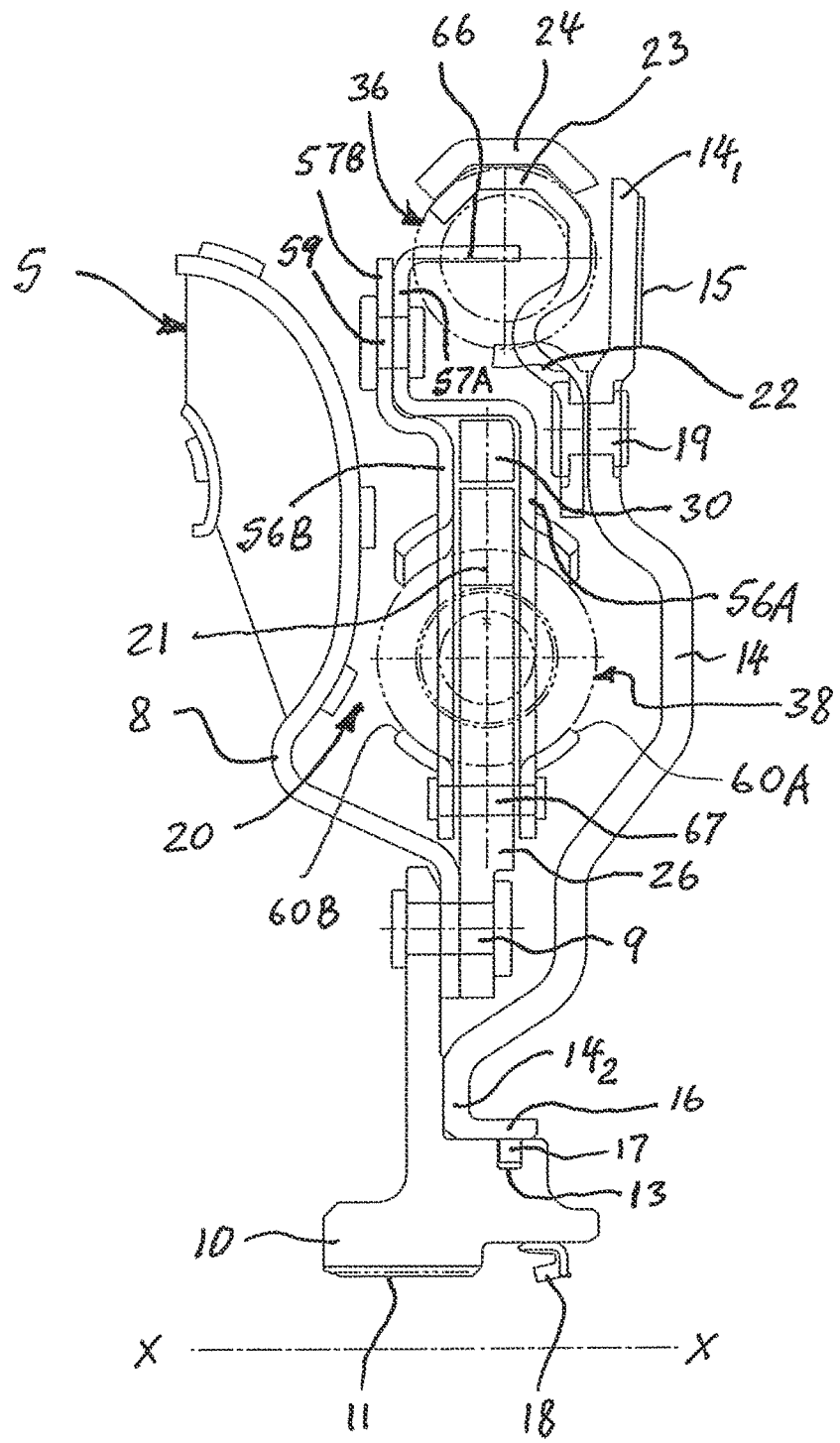
FIG. 2 is a fragmentary cross-sectional half-view of the hydrokinetic torque coupling device with the torsional vibration damper in accordance with the exemplary embodiment of the present invention.

The turbine shell 8 of the turbine wheel 5 is non-movably (i.e., fixedly) secured to the turbine hub 10 by any appropriate means, such as by rivets 9 (as best shown In FIG. 2). Although the rivets 9 are used in the illustrated embodiment, it should be understood that the turbine wheel 5 and the turbine hub 10 may be non-rotatably secured to one another using additional or alternative fasteners or other technique, such as, for example, welding or adhesive bonding. The turbine hub 10 has internal splines 11 and is non-rotatably coupled to the driven shaft, such as an input shaft of the automatic transmission of the motor vehicle, provided with complementary external splines. Alternatively, a weldment or other connection may be used to fix (i.e., non-movably secure) the turbine hub 10 to the driven shaft. A radially outer surface of the turbine hub 10 includes an annular slot 13 (as best shown In FIG. 2) for receiving a sealing member, such as an O-ring 17. The turbine hub 10 is rotatable about the axis X and is coaxial with the driven shaft so as to center the turbine wheel 3 on the driven shaft. A sealing member 18, mounted to a radially inner peripheral surface of the turbine hub 10 as best shown in FIGS. 1 and 2, creates a seal at the interface of the transmission input shaft and the turbine hub 10.

The lock-up clutch 4 is provided for locking together the driving and driven shafts. The lock-up clutch 4 is generally activated after starting of the motor vehicle and after hydraulic coupling of the driving and driven shafts, in order to avoid the loss of efficiency caused, in particular, by slip phenomena between the turbine wheel 5 and the impeller wheel 6. Specifically, the lock-up clutch 4 is provided to bypass the impeller wheel 6 and the turbine wheel 5 when in the closed state.

The lock-up clutch 4 includes a substantially annular locking piston 14 including an annular friction liner 15 fixedly attached to an axially outer surface of the locking piston 14 that faces a locking wall 2a of the casing 2 by any appropriate means known in the art, such as by adhesive bonding. As best shown in FIGS. 1 and 2, the friction liner 15 is fixedly attached to the axially outer surface of the locking piston 14 at a radially outer peripheral end $14_1$ thereof.

The locking piston 14 is axially displaceable toward (an engaged (or locked) position of the lock-up clutch 4) and away (a disengaged (or open) position of the lock-up clutch 4) from the locking wall 2a inside the casing 2. Moreover, the locking piston 14 is axially displaceable away from (the engaged (or locked) position of the lock-up clutch 4) and toward (the disengaged (or open) position of the lock-up clutch 4) the turbine hub 10.

Specifically, extending axially at a radially inner peripheral end $14_2$ of the locking piston 14 is a substantially cylindrical flange 16 that is proximate the rotational axis X, as best shown in FIGS. 1 and 2. The substantially cylindrical flange 16 of the locking piston 14 is rotatable relative to the turbine hub 10. The sealing member (e.g., O-ring) 17 creates a seal at the interface of the substantially cylindrical flange 16 and the turbine hub 10. As discussed in further detail below, the locking piston 14 is axially movably relative to turbine hub 10 along this interface.

The locking piston 14 is selectively pressed against the locking wall 2a of the casing 2, so as to lock up the torque coupling device 1 between the driving and driven shafts so to control sliding movement between the turbine wheel 5 and the impeller wheel 6. Specifically, when sufficient hydraulic pressure in applied to the locking piston 14, the locking piston 14 moves rightward (as shown in FIGS. 1 and 2) toward the locking wall 2a of the casing 2 and away from the turbine wheel 5, and clamps the friction liner 15 between itself and the locking wall 2a of the casing 2. As a result, the lock-up clutch 4 is in the locked position and is mechanically coupled to the turbine hub 10 so as to bypass the impeller wheel 6 and the turbine wheel 5 when in the locked position of the lock-up clutch 4.

During operation, when the lock-up clutch 4 is in the disengaged (open) position, the engine torque is transmitted from the impeller wheel 6 by the turbine wheel 5 of the torque converter 3 to the turbine hub 10. When the lock-up clutch 4 is in the engaged (locked) position, the engine torque is transmitted by the casing 2 to the turbine hub 10 through the torsional vibration damper 20.

The torsional vibration damper 20 advantageously allows the turbine wheel 5 of the torque converter 3 to be coupled, with torque damping, to the input shaft of the automatic transmission. The torsional vibration damper 20 also allows damping of stresses between a first, drive shaft (not shown) and a second, driven shaft (not shown) that are coaxial with the rotation axis X, with torsion damping.

The torsional vibration damper 20, as best shown in FIGS. 1-2, is disposed between the turbine hub 10 that is fixedly (i.e., non-movably) connected with the turbine shell 8 of the turbine wheel 3, and the locking piston 14 of the lock-up clutch 4. Moreover, the locking piston 14 of the lock-up clutch 4 is rotatably coupled to the turbine wheel 5 and the turbine hub 10 by the torsional vibration damper 20. The torsional vibration damper 20 is arranged on the turbine hub 10 in a limited, movable and centered manner. The turbine hub 10 forms an output part of the torsional vibration damper 20 and a driven side of the torque coupling device 1, and is splined with the driven shaft. The locking piston 14, on the other hand, forms an input part of the torsional vibration damper 20.

During the operation, when the lock-up clutch 4 is in the disengaged (open) position, the engine torque is transmitted by the turbine wheel 5 of the torque converter 3 from the impeller wheel 6 to the turbine hub 10, bypassing the torsional vibration damper 20. However, when the lock-up clutch 4 is in the engaged (locked) position, the engine torque is transmitted by the casing 2 to the turbine hub 10 through the torsional vibration damper 20.

As best shown in FIGS. 3-7, the torsional vibration damper 20 comprises a substantially annular drive member 22, a substantially annular first intermediate member 24 rotatably coupled to the drive member 22, and a substantially annular driven member 26 rotatably moveable relative to both the drive member 22 and the first intermediate member 24, and non-movably (i.e., fixedly) secured to the turbine hub 10. The torsional vibration damper 20 also comprises a substantially annular second intermediate member 30 mounted about the driven member 26 and rotatably moveable relative thereto. The drive member 22 constitutes an input member of the torsional vibration damper 20, while the driven member 26 constitutes an output member of the torsional vibration damper 20.

As best shown in FIGS. 1-6, the annular drive member 22, the annular first intermediate member 24 and the annular driven member 26 are coaxial with each other and rotatable about the rotation axis X. The drive member 22 is non-movably (i.e., fixedly) secured to the locking piston 14 by any appropriate means, such as by rivets 19 or welding. The driven member 26 is operatively associated with the turbine wheel 5 and coaxial with the turbine hub 10. The rivets 9 non-rotatably secure the driven member 26 to the turbine hub 10. Thus, the turbine shell 8 of the turbine wheel 5 is fixedly secured to both the turbine hub 10 and the driven member 26 by any appropriate means, such as by the rivets 9 or welding.

The annular drive member 22 includes external (or peripheral), radially outwardly extending driving tabs (or abutment elements) 23 circumferentially equidistantly disposed about an outer periphery thereof for driving engagement with the damper assembly 20, as described below. The drive member 22 with the driving tabs 23 is preferably an integral part, e.g., made of a single or unitary component, but may be separate components fixedly connected together. Preferably, the driving tabs 23 are integrally press-formed on the drive member 22 so as to be equiangularly spaced from each other.

The annular first intermediate member 24 includes internal, radially inwardly extending tabs (or abutment elements) 28 circumferentially equidistantly disposed about an inner periphery thereof. The first intermediate member 24 is preferably a stamped member of suitable metallic construction with the inwardly extending tabs 28 preferably being an integral part, e.g., made of a single or unitary component, but may be separate components fixedly connected together. Preferably, the inwardly extending tabs 28 are integrally press-formed on the first intermediate member 24 so as to be equiangularly spaced from each other.

The torsional vibration damper 20 further comprises a plurality of radially outer elastic damping members (or torque transmitting elements) 36, such as coil springs (damper springs), and a plurality of radially inner elastic damping members (or torque transmitting elements) 38, such as coil springs (damper springs). As best shown in FIGS. 1 and 2, the outer elastic damping members 36 are disposed radially outwardly of the inner elastic damping members 38. The radially outer elastic damping members 36 include first circumferentially acting elastic members 36A and second circumferentially acting elastic members 36B disposed in series relative to each other between the drive member 22 and the first intermediate member 24, as best shown in FIGS. 3-6. The radially inner elastic damping members 38 include a plurality of first circumferentially acting elastic members 38A and a plurality of second circumferentially acting elastic members 38B disposed in series relative to each other between the second intermediate member 30 and the driven member 24, as best shown in FIGS. 3-5 and 7. As best illustrated in FIGS. 2-5, the radially outer elastic damping members 36 and the radially inner elastic damping members 38 are distributed circumferentially around the rotation axis X. As further illustrated in FIGS. 1 and 2, the radially outer and inner elastic damping members 36, 38 are axially and radially spaced from each other.

Figure 5:
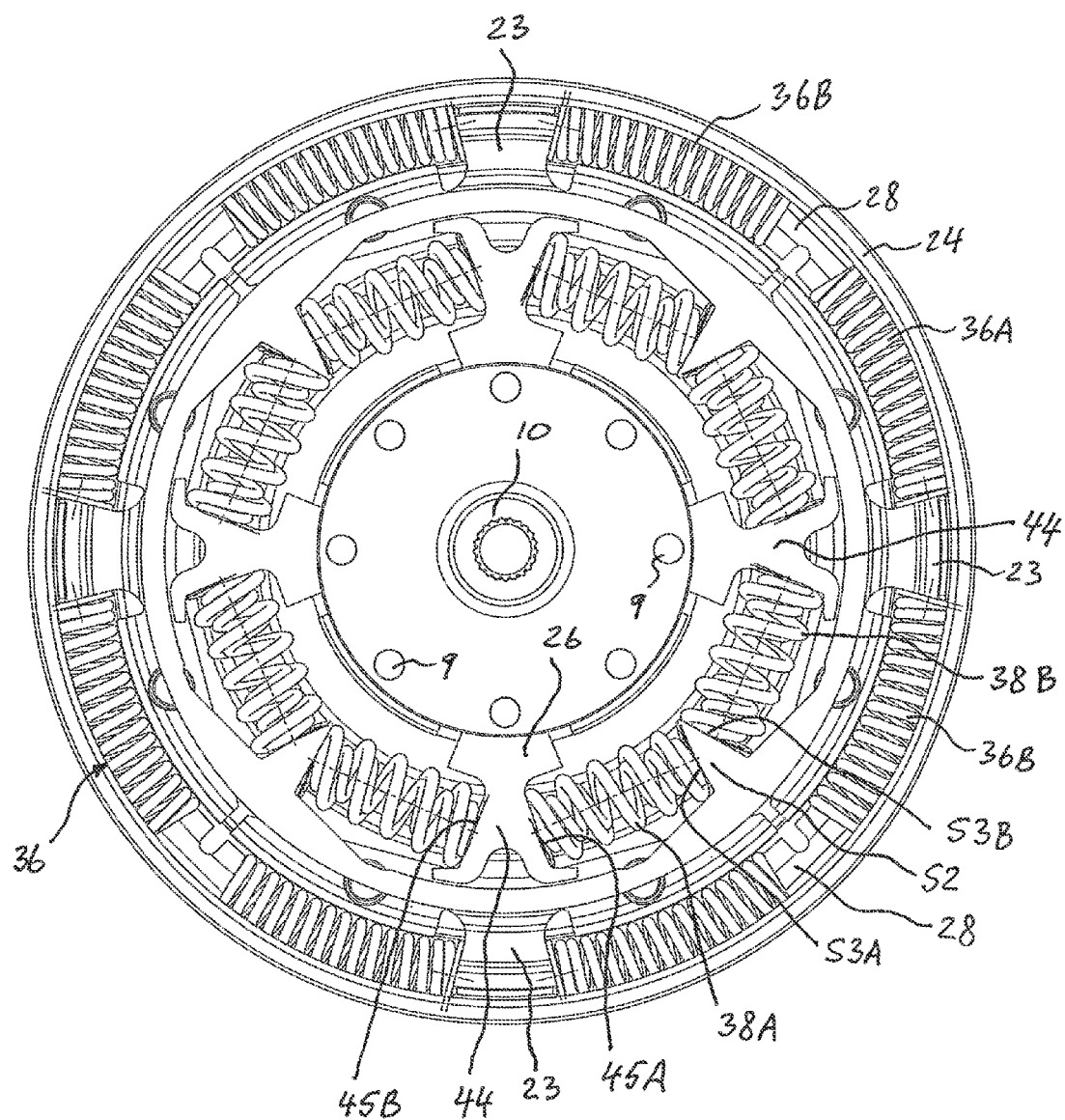
FIG. 5 is a partial front elevational view of the torsional vibration damper of FIG. 3.
Figure 6:
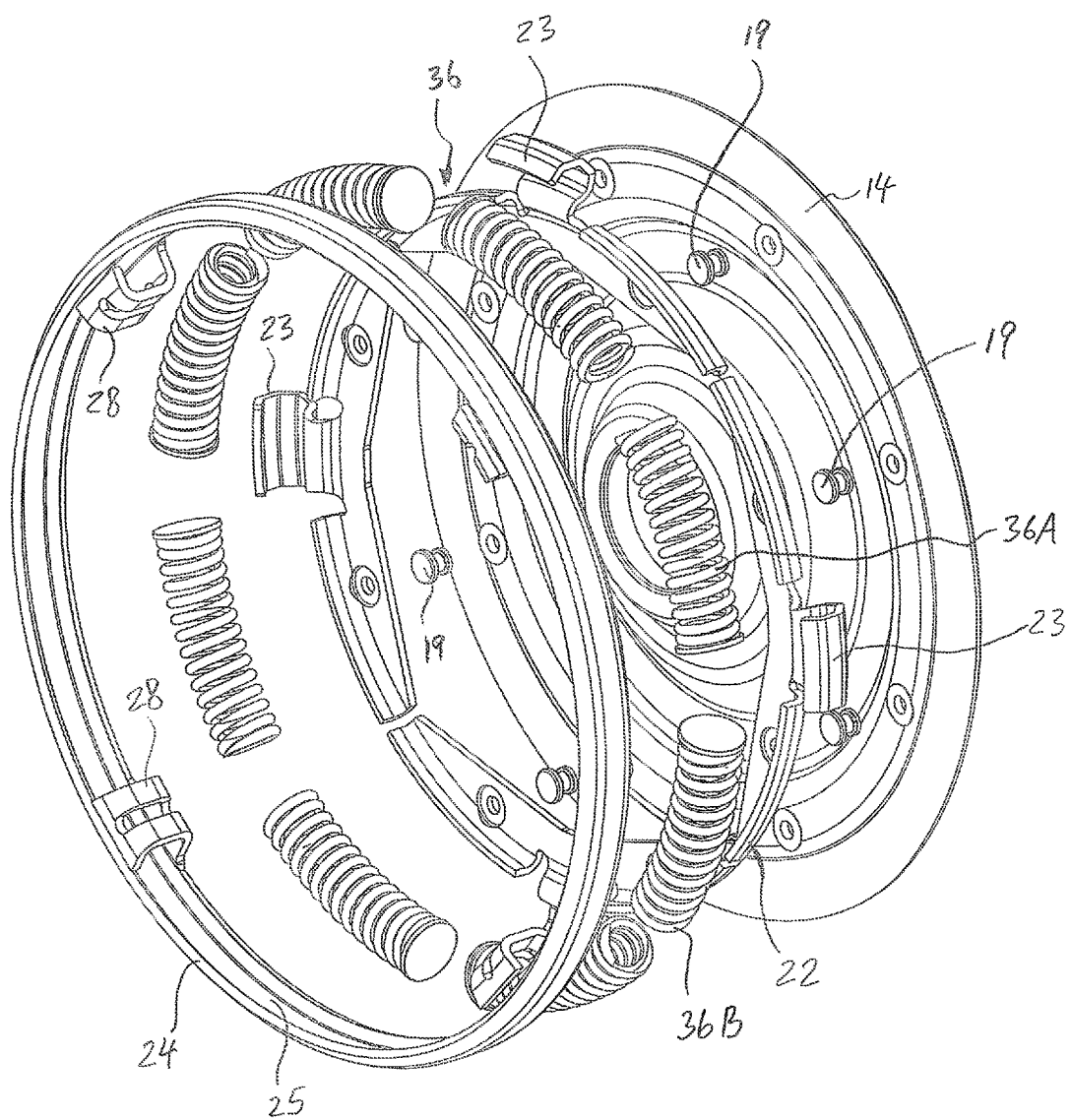
FIG. 6 is an exploded partial assembly perspective view of the torsional vibration damper in accordance with the exemplary embodiment of the present invention, showing radially outer elastic damping members.

The first intermediate member 24 defines a substantially annular groove (or channel) 25 directed radially inwardly around its circumference, as best shown in FIG. 6. The annular groove 25 of the first intermediate member 24 partially houses the radially outer elastic damping members 36, which are distributed about the circumference of the annular groove 25, so as to support the radially outer elastic damping members 36 against the centrifugal force. Moreover, the annular groove 25 of the first intermediate member 24 partially houses the driving tabs 23 of the drive member 22. Furthermore, the driving tabs 23 of the drive member 22 serve to center the first intermediate member 24 with respect to the rotation axis X. As further illustrated in FIGS. 4 and 5, each of the radially outer elastic damping members 36 is disposed circumferentially between the driving tabs 23 of the drive member 22 and the internal tabs 28 of the first intermediate member 24.

Figure 8:
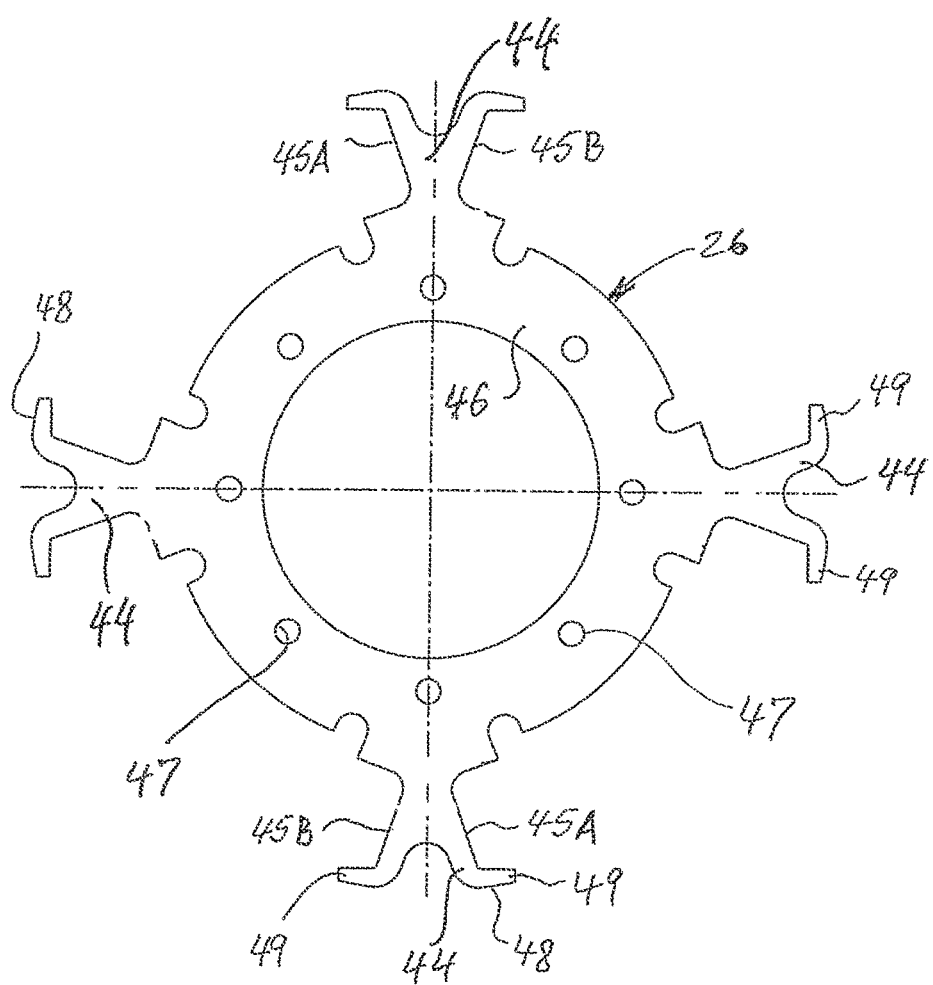
FIG. 8 is a front elevational view of a driven plate in accordance with the exemplary embodiment of the present invention.

The driven member 26, best shown in FIG. 8, includes a substantially annular, flat central plate 46 and a plurality of external radial lugs 44 extending radially outwardly from the central plate 46. The external radial lugs 44 cooperate with the circumferentially acting elastic members 38A, 38B. As illustrated in FIG. 8, the external lugs 44 extend radially outwardly from the central plate 46 of the driven member 26. Moreover, each of the external lugs 44 of the driven member 26 and the central plate 46 are preferably integral with one another, e.g., made of a single or unitary component, but may be separate components fixedly connected together. The external lugs 44 are spaced apart circumferential equidistantly around the rotation axis X. Each of the external radial lugs 44 has circumferentially positioned first and second radial retention faces 45A and 45B, respectively. As best shown in FIG. 5, the first retention faces 45A of the external radial lugs 44 engage the first elastic members 36A, while the second retention faces 45B of the external radial lugs 44 engage the second elastic members 36B. Also, each of the external radial lugs 44 has two circumferentially opposite, circumferentially extending gripping portions 49, as best shown in FIG. 8, retaining the distal ends of the elastic members 38A, 38B on the retention faces 45A and 45B of each of the external radial lugs 44. Each of the external radial lugs 44 has a substantially cylindrical outer peripheral surface 48. The central plate 46 of the driven member 26 is provided with a plurality of circumferentially spaced holes 47. The driven member 26 is fixedly secured to the turbine hub 10 by the rivets 9 extending through the holes 47 in the central plate 46 of the driven member 26.

Figure 9:
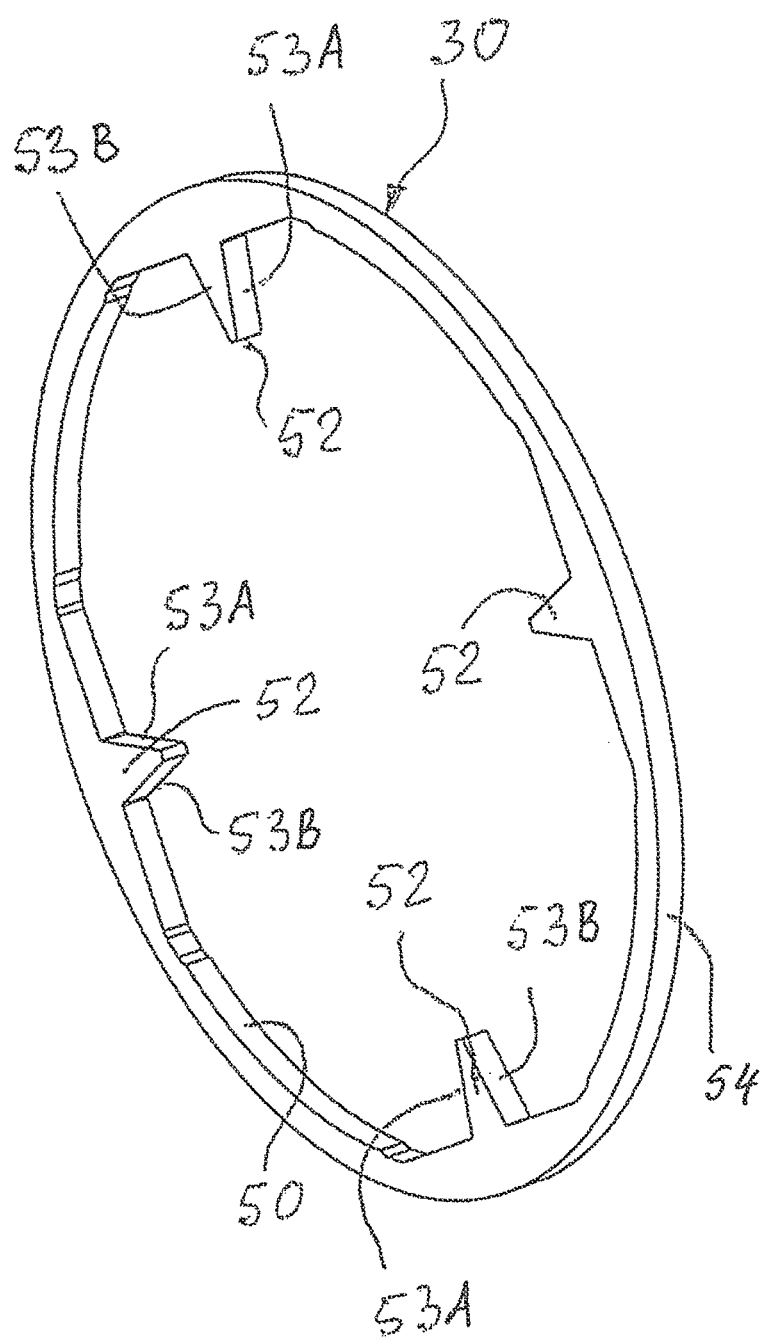
FIG. 9 is a perspective view of a second intermediate member of the torsional vibration damper in accordance with the exemplary embodiment of the present invention.

Similarly, as best shown in FIG. 9, the second intermediate member 30 is formed with a plurality of internal radial lugs 52 which cooperate with the circumferentially acting elastic members 38A, 38B. As illustrated in FIG. 9, the internal radial lugs 52 extend radially inwardly from a generally annular body portion 54 of the second intermediate member 30. Moreover, the internal radial lugs 52 are spaced apart circumferentially equidistantly around the rotation axis X. Each of the internal radial lugs 52 has circumferential first and second radial retention faces 53A and 53B, respectively. As shown in FIG. 5, the first retention faces 53A of the internal radial lugs 52 face the first retention faces 45A of the external radial lugs 44 and engage the first elastic members 38A, while the second retention faces 53B of the internal radial lugs 52 face the second retention faces 45B of the external radial lugs 44 and engage the second elastic members 38B. In non-limiting fashion, in accordance with the exemplary embodiment of the present invention, each of the internal radial lugs 52 has a substantially triangular shape extending radially inwardly. The substantially cylindrical outer peripheral surface 48 of each of the radial lugs 44 is adjacent and complementary to a substantially cylindrical inner peripheral surface 50 of the second intermediate member 30, and serve to center the second intermediate member 30 with respect to the rotation axis X.

Figure 4:
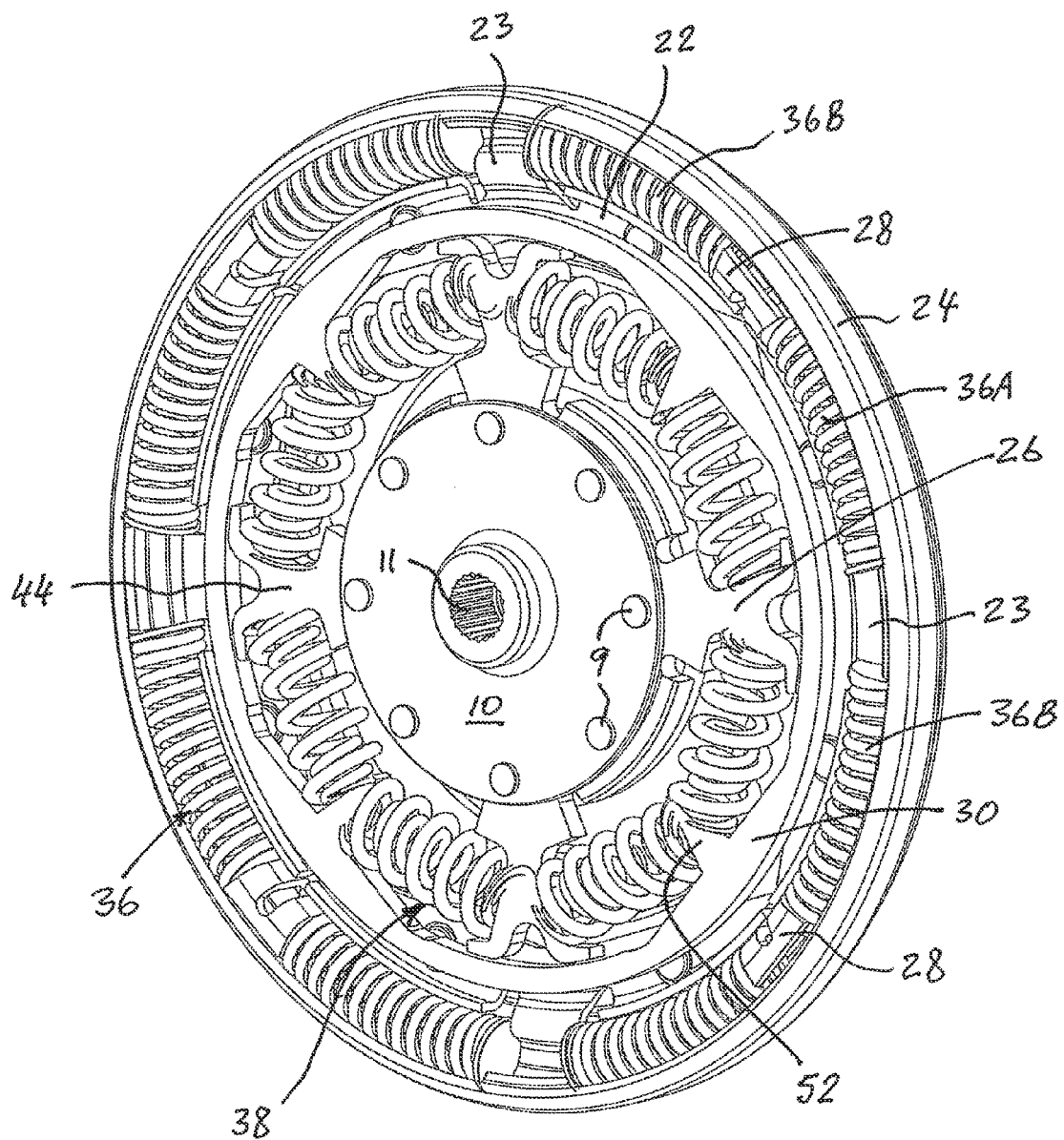
FIG. 4 is a partial perspective view of the torsional vibration damper in accordance with the exemplary embodiment of the present invention.

As further shown in FIGS. 4 and 5, the elastic members 38A, 38B of each pair are disposed and compressed between the external radial lugs 44 of the driven member 26 and the internal radial lugs 52 of the second intermediate member 30 in order to damp sudden changes in torque.

Each of the driven member 26 and the second intermediate member 30 is preferably a substantially annular plate having axially opposite and substantially plane (or flat) surfaces. It is well known in the art that a plane surface is a surface in which if any two points are chosen a straight line joining them lies wholly in that surface. It is also known in the art that even for a single planar plate, the axially opposite surfaces are not perfectly planar (or flat) as they are subject to manufacturing tolerances (or variations) around a nominal value as allowed in the production thereof. The present invention seeks to substantially approximate axially opposite plane surfaces of the annular plate so that the axially opposite plane surfaces are substantially planar surfaces.

Moreover, the opposite plane surfaces of each of the driven member 26 and the second intermediate member 30 have free radially outer and inner perimeters lying in the same plane. Furthermore, the driven member 26, the second intermediate member 30 and the radially inner elastic damping members 38 are axially aligned (or are in alignment) with each other along a radial axis 21, as best shown in FIG. 2. When centers of gravity are aligned, bending effect on the driven member 26 and the second intermediate member 30 under high speed rotational loading of masses and springs is avoided. The radial axis 21 is perpendicular to the rotation axis X.

The torsional vibration damper 20 further comprises a first, front damper retainer plate (or guide washer) 56A and a second, rear damper retainer plate (or guide washer) 56B, as best shown in FIG. 2. The first and second damper retainer plates 56A, 56B are axially mounted adjacent to opposite sides of the driven member 26 and the second intermediate member 30 so as to be oriented parallel to each other and coaxially with the rotation axis X. Moreover, the first and second damper retainer plate 56A, 56B are arranged axially on either side of the outer elastic damping members 36A, 36B and are operatively connected therewith. The first and second damper retainer plates 56A, 56B are non-movably (i.e., fixedly) secured to one another by any appropriate means, such as by fasteners or welding, so as to be rotatable relative to the driven member 26 and the second intermediate member 30.

Figure 7:
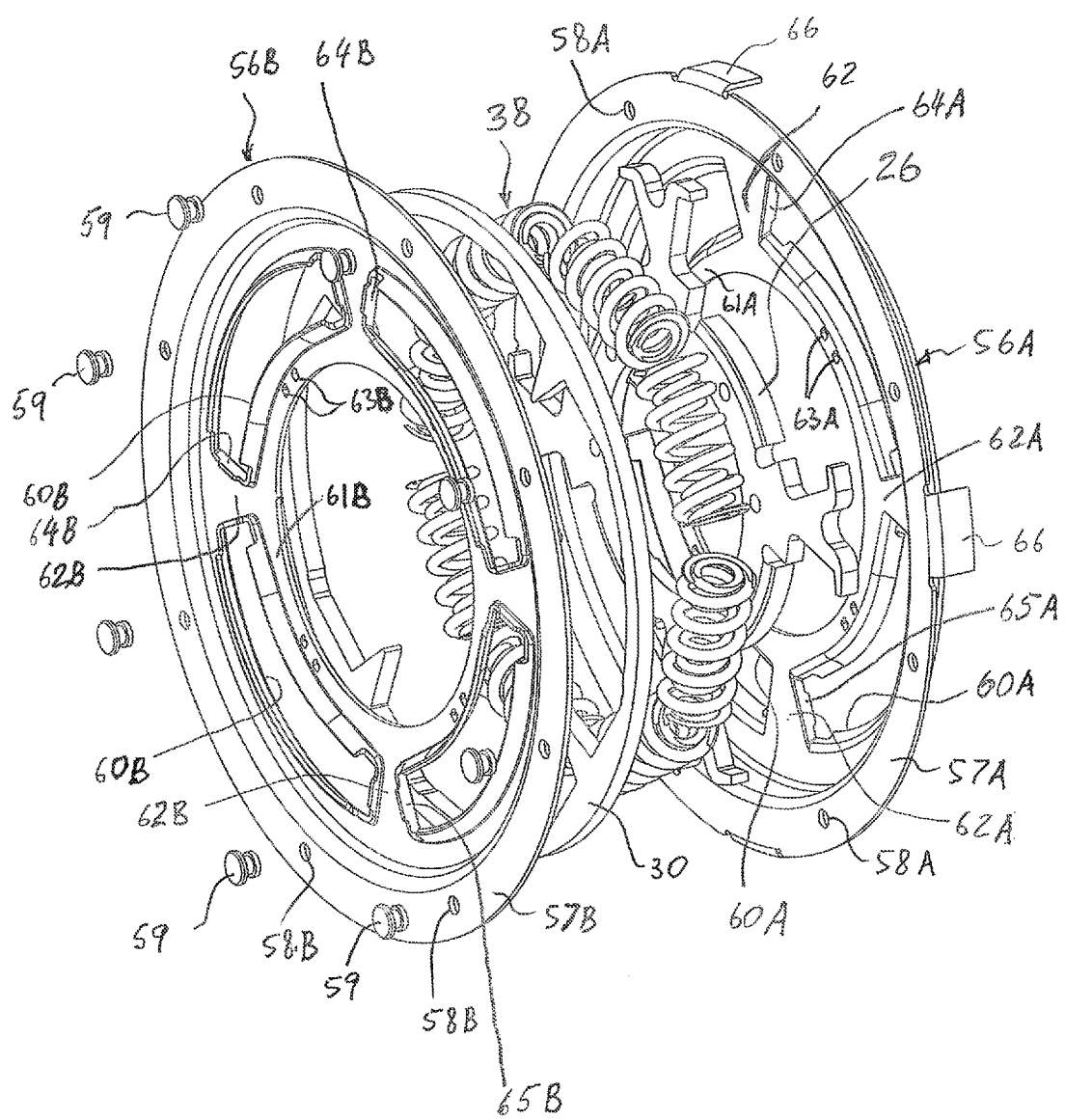
FIG. 7 is an exploded partial assembly perspective view of the torsional vibration damper in accordance with the exemplary embodiment of the present invention, showing radially inner elastic damping members.

According to the exemplary embodiment of the present invention as best illustrated in FIG. 7, the first damper retainer plate 56A has a substantially annular outer mounting flange 57A provided with a plurality of circumferentially spaced holes 58A, and a substantially annular inner mounting flange 61A provided with a plurality of circumferentially spaced holes 63A. The second damper retainer plate 56B, on the other hand, has a substantially annular outer mounting flange 57B provided with a plurality of circumferentially spaced holes 58B, and a substantially annular inner mounting flange 61B provided with a plurality of circumferentially spaced holes 63B. The first and second damper retainer plates 56A, 56B are non-movably (i.e., fixedly) secured to one another so that the outer mounting flanges 57A, 57B of the first and second damper retainer plates 56A, 56B are engaging the axially opposite surfaces thereof by the rivets 59 extending through the holes 58A, 58B in the outer mounting flanges 57A, 57B of the first and second damper retainer plates 56A, 56B. Moreover, the first and second damper retainer plates 56A, 56B are non-rotatably secured to one another by fasteners 67 extending through the holes 63A, 63B in the inner mounting flanges 61A, 61B of the first and second damper retainer plates 56A, 56B so as to be rotatable relative to the driven member 26 and the second intermediate member 30. Thus, the first and second damper retainer plates 56A, 56B are non-rotatable relative to one another, but rotatable relative to the driven member 26 and the second intermediate member 30.

Each of the first and second damper retainer plates 56A, 56B is provided with a plurality of circumferentially extending windows (or openings) 60A, 60B, respectively, each of which is arranged in correspondence with a pair of the inner elastic damping members 38A, 38B, as best depicted in FIGS. 2, 4, 5 and 7. In other words, each of the windows 60A, 60B receives a single pair of elastic members: one of the first inner elastic damping members 38A and one of the second inner elastic damping members 38B separated by the internal radial lug 52 of the second intermediate plate 30, as best shown in FIGS. 4 and 5.

The windows 60A, 60B are separated circumferentially from one another alternately by radial tabs 62A, 62B. Each of the first and second damper retainer plates 56A, 56B according to the exemplary embodiment of the present invention has four windows 60A, 60B and four radial tabs 62A, 62B. Moreover, each of the windows 60A, 60B, or each of the radial tabs 62A, 62B, is delimited circumferentially by a first radial end face 64A, 64B on the one hand, and by a second radial end face 65A, 65B on the other hand, oriented circumferentially opposite to each other. Thus, each of the radial tabs 62A, 62B is interposed circumferentially between the two elastic members 38A, 38B in series of each pair. The first radial end face 64A, 64B and the second radial end face 65A, 65B that are interposed between elastic members 36A, 36B of a single pair are thus carried by one common radial tab 62A, 62B.

The radial tabs 62A of the first retainer plate 56A are arranged in axial correspondence (i.e., radially aligned) with the radial tabs 62B of second retainer plate 56B. As best shown in FIGS. 4, 5 and 7, the external radial lugs 44 of the driven member 26 are radially aligned with the radial tabs 62A, 62B separating the windows 60A, 60B in the first and second damper retainer plates 56A, 56B when no torque is transmitted by the torsional vibration damper 20. Consequently, the windows 60A of the first retainer plate 56A are arranged in axial correspondence (i.e., angularly aligned) with the windows 60B of second retainer plate 56B.

As further illustrated in FIGS. 1 and 2, the first and second damper retainer plate 56A, 56B are axially spaced from the radial axis 21, i.e., from the driven member 26 and the second intermediate member 30. Moreover, the outer elastic damping members 36 are axially spaced from the inner elastic damping members 38.

Figure 3:
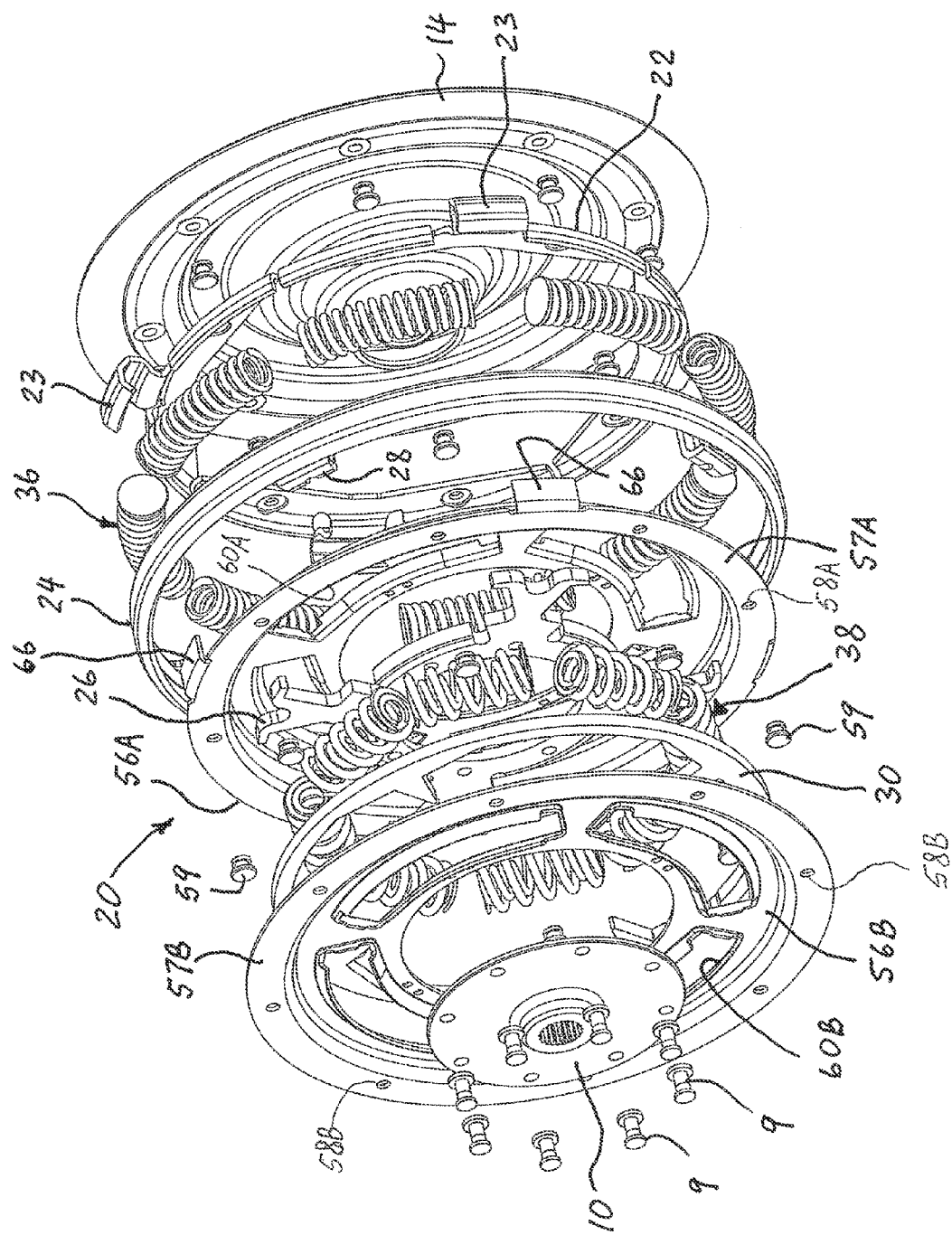
FIG. 3 is an exploded assembly perspective view of the torsional vibration damper in accordance with the exemplary embodiment of the present invention.

As best shown in FIGS. 2, 3 and 7, the first damper retainer plate 56A further includes one or more peripheral abutment elements 66 extending axially outwardly from the outer mounting flange 57A of the first damper retainer plate 56A away from the second damper retainer plate 56B toward the drive member 22. According to the exemplary embodiment of the present invention, the abutment elements 66 are integrally press-formed on the first damper retainer plate 56A so as to be equiangularly spaced from each other. The abutment elements 66 have abutment surfaces on circumferential ends of the mutually facing abutment elements 66. The abutment elements 66 of the first damper retainer plate 56A are operatively connected with the radially outer elastic damping members 36A, 36B.

Accordingly, the radially outer elastic damping members 36 are held in the interface between the internal tabs 28 of the first intermediate member 24, the driving tabs 23 of the drive member 22 and the abutment elements 66 of the first damper retainer plate 56A so as to transmit damped rotational torque from the locking piston 14 to the first and second damper retainer plates 56A, 56B through the radially outer elastic damping members 36 and the first intermediate member 24. As best shown in FIGS. 2 and 3, the driving tabs 23 of the drive member 22 and the abutment elements 66 of the first damper retainer plate 56A are circumferentially (or angularly) aligned with each other. In other words, the first intermediate member 24 is drivingly connected to the first and second damper retainer plates 56A, 56B through the radially outer elastic damping members 36. In turn, the drive member 22 is drivingly connected to the first intermediate member 24 through the radially outer elastic damping members 36. Thus, the radially outer elastic damping members 36 are disposed and are compressible between the driving tabs 23 of the drive member 22 and the internal tabs 28 of the first intermediate member 24, and between the driving tabs 23 of the drive member 22 and the abutment elements 66 of the first damper retainer plate 56A.

During operation, when the lock-up clutch 4 is in the disengaged (open) position, the engine torque is transmitted from the impeller wheel 6 by the turbine wheel 5 of the torque converter 3 to the turbine hub 10. When the lock-up clutch 4 is in the engaged (locked) position (i.e., when the locking piston 14 is engaged (or locked) against the locking wall 2a of the casing 2 by action of the hydraulic pressure), the engine torque is transmitted by the casing 2 to the turbine hub 10 through the torsional vibration damper 20.

The operation of the torsional vibration damper 20 in the locked position is as follows. Abrupt changes in engine torque are transmitted from the locking piston 14 to the drive member 22, which constitutes an input member of the torsional vibration damper 20, and from the drive member 22 to the first damper retainer plate 56A via the first intermediate member 24 and the radially outer elastic damping members 36. Then, the suitably damped engine torque is passed from the first and second damper retainer plates 56A, 56B to the driven member 26, which constitutes an output member of the torsional vibration damper 20, via the second intermediate member 30 and the radially inner elastic damping members 38.

More specifically, the operation of the torsional vibration damper 20 in the locked position is as follows. Abrupt changes in engine torque (engine torsional vibration) are transmitted from the locking piston 14 to the drive member 22 and from the driving tabs 23 of the drive member 22 to the first intermediate member 24. The elastic members of each pair of the radially outer elastic damping members 36A, 36B are compressed between the external radial driving tabs 23 of the drive member 22 and the internal tabs 28 of the first intermediate member 24 in order to damp abrupt changes in torque, then between the internal tabs 28 of the first intermediate member 24 and the abutment elements 66 of the first damper retainer plate 56A in order to transmit dampened torque from the drive member 22 to the first damper retainer plate 56A.

Next, the torque from the first damper retainer plate 56A is transmitted to the second intermediate member 30 through the pair of the radially inner elastic damping members 38A, 38B. Specifically, each of the radial tabs 62A, 62B of the first and second damper retainer plates 56A, 56B load the associated one of the elastic members 38A, 38B. The one of the elastic members 38A, 38B conveys this torque to another of the elastic members 38A, 38B via the internal radial lugs 52 of the second intermediate member 30. Then, the other of the elastic members 38A, 38B transmits the force to the associated external radial lugs 44 of the driven member 26. More specifically, the first and second damper retainer plates 56A, 56B rotate through a defined angle around rotation axis X with respect to the second intermediate member 30, causing simultaneous compression of the elastic members 38A, 38B of each pair. The radial tabs 62A, 62B of the first and second damper retainer plates 56A, 56B transmit the compressive force from one of the elastic members 38A, 38B to the other through the internal radial lugs 52 of the second intermediate member 30. Because of this compression, the driven member 26 rotates through a portion of the defined angle with respect to the first and second damper retainer plates 56A, 56B. Subsequently, the engine torque, suitably dampened by the elastic members 38A, 38B, is transmitted from the driven member 26 to the turbine hub 10.

Thus, the radially outer elastic damping members 36 are connected in series to the radially inner elastic damping members 38. In other words, the radially outer and inner elastic damping members 36, 38 are arranged in series by means of the first damper retainer plate 56A.

Described below is an exemplary method whereby the hydrokinetic torque coupling device 10 according to the exemplary embodiment of the present invention is assembled. It should be understood that alternative methods may be practiced within the scope of the invention.

According to an embodied method, the turbine wheel 5, the turbine hub 10, the driven member 26, the radially outer and inner elastic damping members 36 and 38, the first and second intermediate members 24 and 30, the first and second damper retainer plates 56A, 56B, and the drive member 22 including the driving tabs 23 are provided.

The drive member 22 is non-moveably attached (i.e., fixed) to the locking piston 14 by any appropriate means, such as by the rivets 19. Then, the first intermediate member 24 with the radially outer elastic damping members 36 are mounted to the drive member 22 so that the radially outer elastic damping members 36A, 36B are disposed between the driving tabs 23 of the drive member 22 and the inwardly extending tabs 28 of the first intermediate member 24.

Independently from the above step, the first and second damper retainer plates 56A, 56B are non-moveably attached (i.e., fixed) substantially parallel to each other and coaxially with the rotation axis X by any appropriate means, such as by the rivets 59 and 67, so that the driven member 26 and the second intermediate member 30 with the radially inner elastic damping members 38 are disposed between the first and second damper retainer plates 56A, 56B. The radially inner elastic damping members 38 are mounted between the driven member 26 and the second intermediate member 30 so that each of the radially inner elastic damping members 38A, 38B is disposed between one of the external radial lugs 44 of the driven member 26 and one of the internal radial lugs 52 of the second intermediate member 30. Moreover, each of the windows 60A, 60B of the first and second damper retainer plates 56A, 56B, respectively, receives a single pair of elastic members: one of the first elastic members 38A and one of the second elastic members 38B separated by the internal radial lug 52 of the second intermediate plate 30. The first and second damper retainer plates 56A, 56B are fixed to each other so that the peripheral abutment elements 66 of the first damper retainer plate 56A are facing away from the second damper retainer plate 56B.

Then, the turbine wheel 5 and the driven member 26 (with the second intermediate member 30, the radially inner elastic damping members 38 and the first and second damper retainer plates 56A, 56B) are non-moveably attached (i.e., fixed) to the turbine hub 10 by any appropriate means, such as by the rivets 9.

Next, the cylindrical flange 16 of the locking piston 14 is mounted to the turbine hub 10 by sliding the locking piston 14 leftward (as shown in FIG. 2) so that each of the abutment elements 66 of the first damper retainer plate 56A is disposed between the pair of the radially inner elastic damping members 38A, 38B and angularly aligned with one of the driving tabs 23 of the drive member 22.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the hydrokinetic torque coupling device comprising:
   a casing rotatable about a rotation axis;
   a torque converter including an impeller wheel and a turbine wheel disposed in the casing coaxially with the rotation axis;
   a turbine hub disposed in the casing coaxially with the rotation axis and non-rotatably secured to the turbine wheel; and
   a torsional vibration damper comprising:
      a drive member rotatable about the rotation axis;
      a driven member rotatable relative to the drive member about the rotation axis and non-rotatably secured to the turbine hub;
      a plurality of radially outer elastic damping members interposed and circumferentially acting between the drive member and the driven member; and
      a plurality of radially inner elastic damping members interposed and circumferentially acting between the drive member and the driven member;
      the drive member and the driven member operatively connected to both the radially outer and inner elastic damping members;
   the radially outer and inner elastic damping members being arranged in series and, wherein the torsional vibration damper further comprises:
   a first intermediate member rotatable relative to the drive member about the rotation axis;
   a second intermediate member rotatable relative to the first intermediate member about the rotation axis; and
   a first damper retainer plate rotatably mounted to the driven member and the second intermediate member coaxially with the rotation axis so that the first damper retainer plate is operatively connected to both the radially outer and inner elastic damping members;
   wherein the radially outer elastic damping members are interposed and circumferentially acting between the drive member and the first intermediate member;
   wherein the driven member is rotatable relative to the second intermediate member about the rotation axis;
   wherein the radially inner elastic damping members are interposed and circumferentially acting between the second intermediate member and the driven member;
   wherein the first damper retainer plate is rotatable relative to the drive member, the first and second intermediate members and the driven member about the rotation axis; and
      wherein the radially outer and inner elastic damping members are arranged in series by means of the first damper retainer plate.

2. The hydrokinetic torque coupling device as defined in claim 1, wherein the radially outer elastic damping members drivingly connect the drive member to the first intermediate member and the second intermediate member.

3. The hydrokinetic torque coupling device as defined in claim 2, wherein each of the drive member and the first intermediate member includes abutment elements such that the radially outer elastic damping members are disposed and are compressible between the abutment elements of the drive member and the first intermediate member; and wherein the first damper retainer plate includes abutment elements operatively connecting the first damper retainer plate to the radially outer elastic damping members.

4. The hydrokinetic torque coupling device as defined in claim 2, wherein the radially inner elastic damping members drivingly connect the second intermediate member to the driven member.

5. The hydrokinetic torque coupling device as defined in claim 4, wherein the first damper retainer plate includes abutment elements operatively connecting the first damper retainer plate to the radially outer elastic damping members; wherein each of the driven member and the second intermediate member includes lugs such that the radially inner elastic damping members are disposed and are compressible between the lugs of the driven member and the second intermediate member; wherein the first damper retainer plate has a plurality of circumferentially oriented windows separated circumferentially from one another by radial tabs; and wherein the radially outer elastic damping members are interposed between the lugs of the second intermediate member and the radial tabs of the first damper retainer plate in the windows through the first damper retainer plate.

6. The hydrokinetic torque coupling device as defined in claim 1, further comprising a lock-up clutch including a locking piston axially moveable along the rotation axis to and from a substantially radial locking wall of the casing so as to selectively engage the locking piston against the locking wall of the casing; wherein the drive member is non-rotatably coupled to the locking piston.

7. The hydrokinetic torque coupling device as defined in claim 1, wherein each of the driven member and the second intermediate member is a flat plate having axially opposite plane surfaces.

8. The hydrokinetic torque coupling device as defined in claim 7, wherein the driven member and the second intermediate member are aligned along a radial axis perpendicular to said rotation axis.

9. The hydrokinetic torque coupling device as defined in claim 2, wherein the first intermediate member has a substantially annular groove directed radially inwardly; and wherein said first intermediate member partially houses and radially supports the radially outer elastic damping members.

10. The hydrokinetic torque coupling device as defined in claim 1, further comprising a second damper retainer plate non-moveably secured to the first damper retainer plate and coaxially with the rotation axis, the second damper retainer plate operatively connected to the radially inner elastic damping members.

11. A torsional vibration damper for a hydrokinetic torque coupling device, comprising:
   an input member rotatable about the rotation axis;
   an output member rotatable relative to the input member about the rotation axis;
   a plurality of radially outer elastic damping members interposed and circumferentially acting between the input member and the output member; and
   a plurality of radially inner elastic damping members interposed and circumferentially acting between the input member and the output member;
   the input member and the output member operatively connected to both the radially outer and inner elastic damping members;
   the radially outer and inner elastic damping members being arranged in series; and,
   a first intermediate member rotatable relative to the input member about the rotation axis;
   a second intermediate member rotatable relative to the first intermediate member about the rotation axis; and a first damper retainer plate rotatably mounted to the output member and the second intermediate member coaxially with the rotation axis so that the first damper retainer plate is operatively connected to both the radially outer and inner elastic damping members;

wherein the radially outer elastic damping members are interposed and circumferentially acting between the input member and the first intermediate member;

wherein the output member is rotatable relative to the second intermediate member about the rotation axis;

wherein the radially inner elastic damping members are interposed and circumferentially acting between the second intermediate member and the output member;

wherein the first damper retainer plate is rotatable relative to the input member, the first and second intermediate members and the output member about the rotation axis; and wherein the radially outer and inner elastic damping members are arranged in series by means of the first damper retainer plate.

12. The torsional vibration damper as defined in claim 11, wherein the second intermediate member has a substantially annular groove directed radially inwardly; and wherein said intermediate member partially houses and radially supports the radially outer elastic damping members.

13. The torsional vibration damper as defined in claim 11, wherein the radially outer elastic damping members drivingly connect the input member to the first intermediate member and the second intermediate member.

14. The torsional vibration damper as defined in claim 13, wherein each of the input member and the first intermediate member includes abutment elements such that the radially outer elastic damping members are disposed and are compressible between the abutment elements of the input member and the first intermediate member; and wherein the first damper retainer plate includes abutment elements operatively connecting the first damper retainer plate to the radially outer elastic damping members.

15. The torsional vibration damper as defined in claim 13, wherein the radially inner elastic damping members drivingly connect the second intermediate member to the output member.

16. The torsional vibration damper as defined in claim 15, wherein the first damper retainer plate includes abutment elements operatively connecting the first damper retainer plate to the radially outer elastic damping members; wherein each of the output member and the second intermediate member includes lugs such that the radially inner elastic damping members are disposed and are compressible between the lugs of the output member and the second intermediate member; wherein the first damper retainer plate has a plurality of circumferentially oriented windows separated circumferentially from one another by radial tabs; and wherein the radially outer elastic damping members are interposed between the lugs of the second intermediate member and the radial tabs of the first damper retainer plate in the windows through the first damper retainer plate.

17. The torsional vibration damper as defined in claim 11, wherein each of the output member and the second intermediate member is in the form of a flat plate having axially opposite plane surfaces.

18. The torsional vibration damper as defined in claim 17, wherein the output member and the second intermediate member are aligned along a radial axis perpendicular to said rotation axis.

19. The torsional vibration damper as defined in claim 11, further comprising a second damper retainer plate non-moveably secured to the first damper retainer plate and coaxially with the rotation axis, the second damper retainer plate operatively connected to the radially inner elastic damping members.

20. A method for assembling a torsional vibration damper for a hydrokinetic torque coupling device, the method comprising the steps of:

providing a turbine wheel 5, turbine hub 10, driven member 26, locking piston 14, radially outer and inner elastic damping members 36 and 38, first and second intermediate members 24 and 30, first and second damper retainer plates 56A, 56B, and a drive member 22 including driving tabs 23;

attaching drive member 22 non-moveably to the locking piston 14;

mounting the first intermediate member 24, equipped with the radially outer elastic damping members 36, to the drive member 22 so that the radially outer elastic damping members 36A, 36B are disposed between the driving tabs 23 of the drive member 22 and inwardly extending tabs 28 of the first intermediate member 24;

attaching first and second damper retainer plates 56A, 56B substantially parallel to each other and coaxially, so that the driven member 26 and the second intermediate member 30 with the radially inner elastic damping members 38 are disposed between the first and second damper retainer plates 56A, 56B, and the radially inner elastic damping members 38 are mounted between the driven member 26 and the second intermediate member 30 so that each of the radially inner elastic damping members 38 are disposed between an external radial lug 44 of the driven member 26 and an internal radial lug 52 of the second intermediate member 30, and wherein said first and second damper retainer plates 56A, 56B are fixed to each other so that peripheral abutment elements 66 of the first damper retainer plate 56A are facing away from the second damper retainer plate 56B, non-moveably attaching the turbine wheel 5 to the turbine hub 10; and, mounting a cylindrical flange 16 of the locking piston 14 to the turbine hub 10 so that abutment elements 66 of the first damper retainer plate 56A are disposed between an adjacent pair of the radially inner elastic damping members 38, and angularly aligned with one of the driving tabs 23 of the drive member 22.

* * * * *